United States Patent

Lien

[11] Patent Number: 5,097,685
[45] Date of Patent: Mar. 24, 1992

[54] ADJUSTABLE STEERING LOCK

[76] Inventor: Jack Lien, No. 30, Yen Chi Street, Kaohsiung City, Taiwan

[21] Appl. No.: 696,762

[22] Filed: May 7, 1991

[51] Int. Cl.$^5$ ............................................. B60R 25/02
[52] U.S. Cl. ...................................... 70/209; 70/211; 70/226; 70/238
[58] Field of Search ................. 70/209, 211, 212, 225, 70/226, 237, 238

[56] References Cited

U.S. PATENT DOCUMENTS

| | | | |
|---|---|---|---|
| 1,193,679 | 8/1916 | Fox | 70/211 |
| 3,138,036 | 6/1964 | Carson | 70/211 |
| 4,134,282 | 1/1979 | Callahan | 70/212 |
| 5,007,259 | 4/1991 | Mellard | 70/209 |
| 5,025,646 | 6/1991 | Waguespack, Jr. | 70/209 |

FOREIGN PATENT DOCUMENTS 2639591  6/1990 France ........................... 70/226

Primary Examiner—Lloyd A. Gall
Attorney, Agent, or Firm—Bacon & Thomas

[57] ABSTRACT

For locking up a car steering wheel a steering lock of the type comprising a lock case which has a cylinder controlled by a key to lock two snap catches on a car steering wheel at two locations on the periphery of said car steering wheel defining therebetween a circumferential angle of 180°, an stop plate assembly which comprises a L-shaped base plate secured to said lock case at a back through face joint and an extension plate vertically extending from the base plate at one end and disposed to stop against a car instrument dash board, and a stop plate which has one end fastened in the lock case and an opposite end stopped against a car front door window.

6 Claims, 5 Drawing Sheets

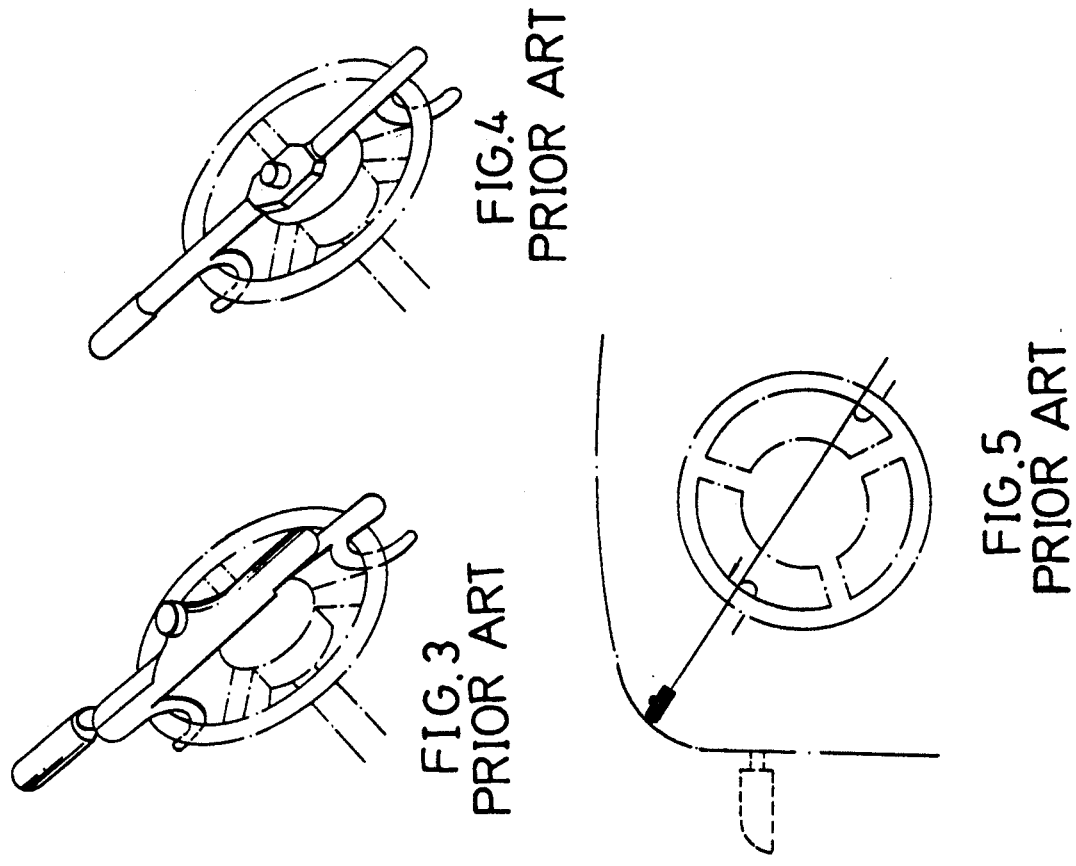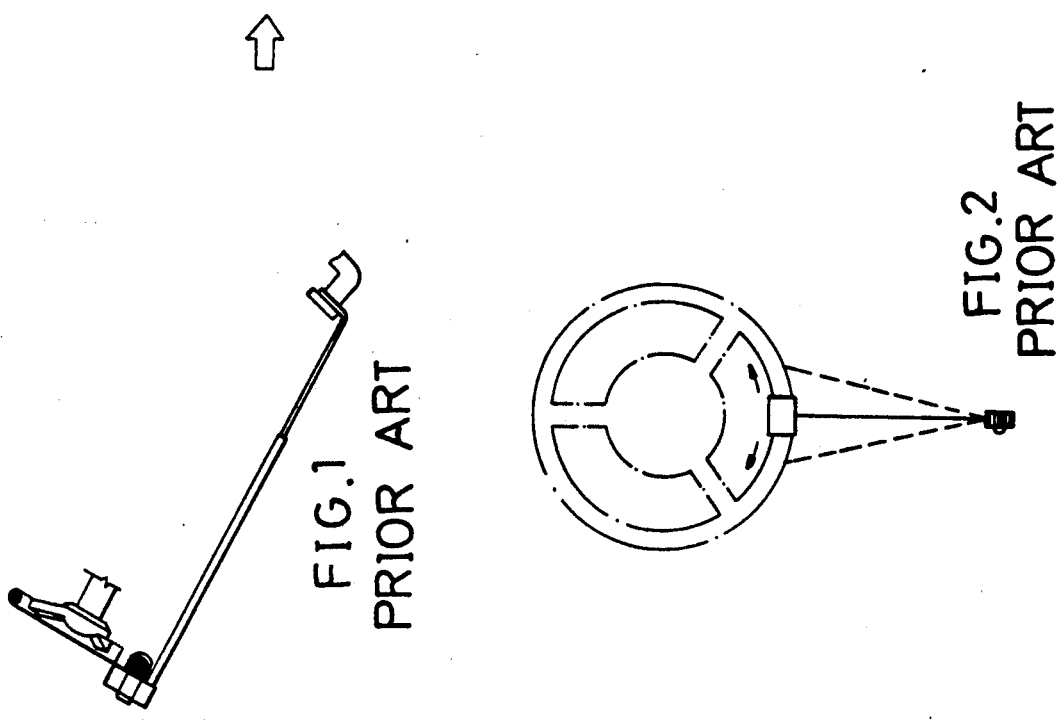

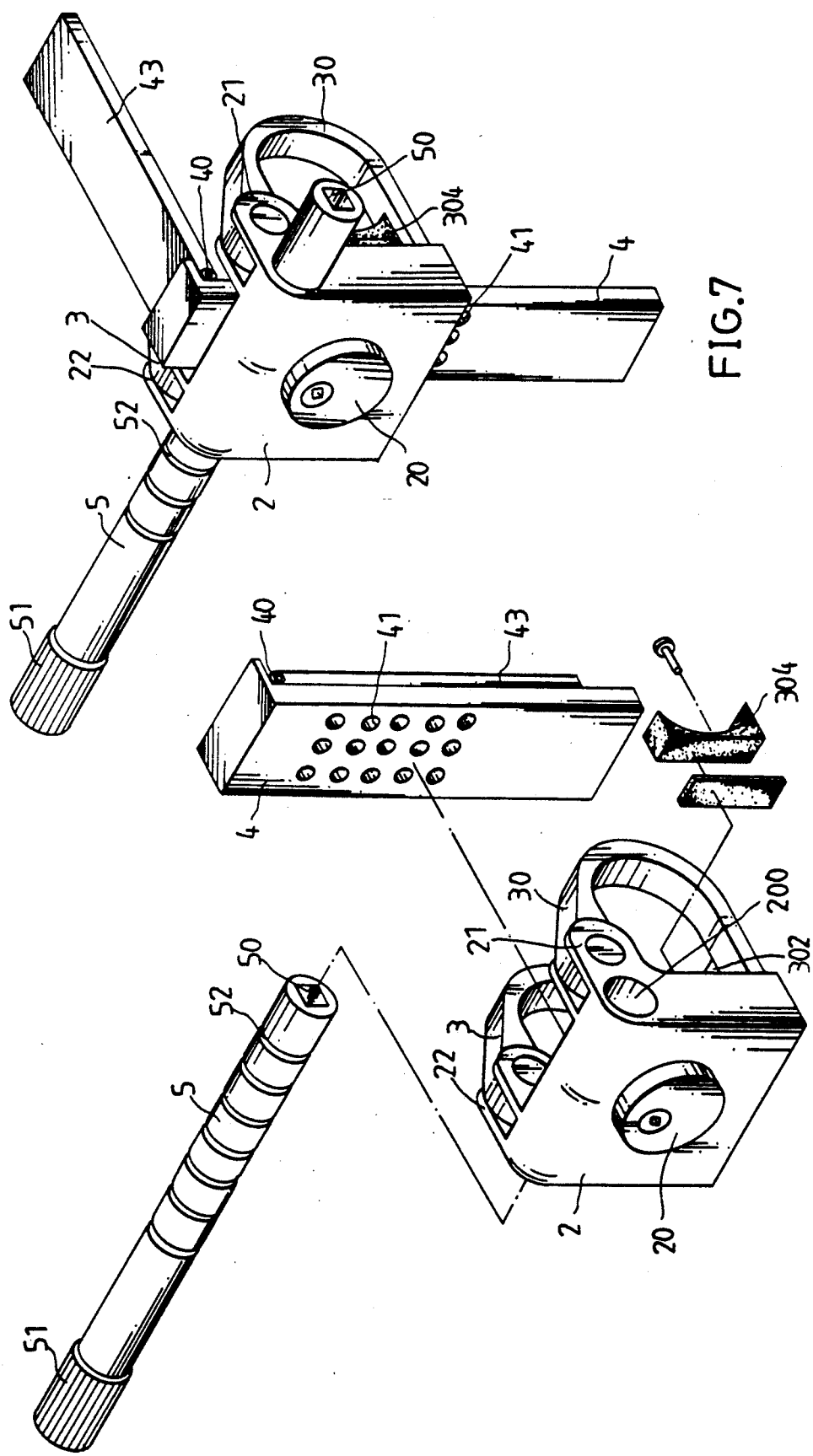

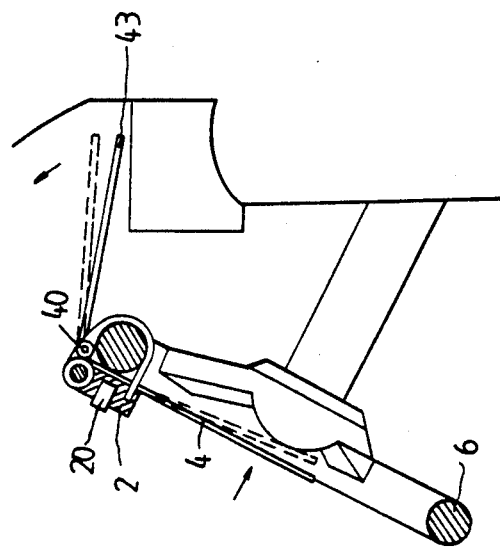
FIG.10
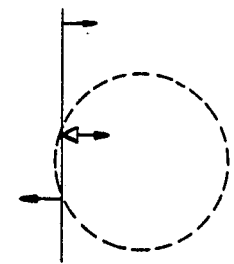
FIG.11
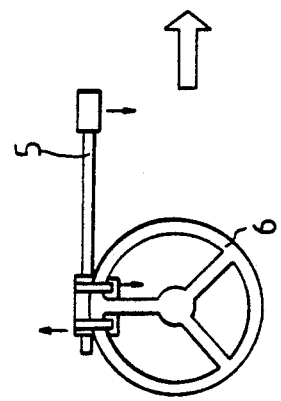
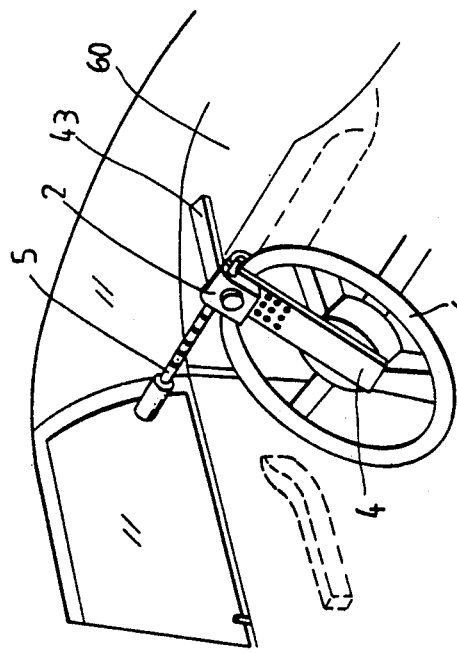
FIG.8
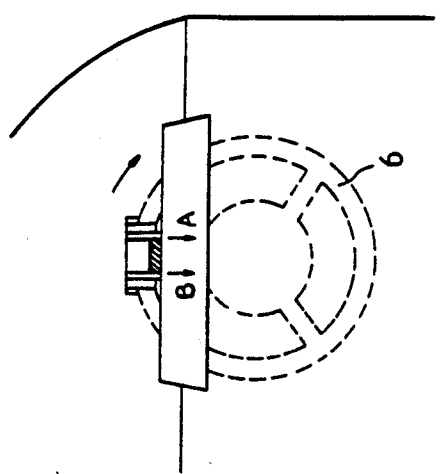
FIG.9

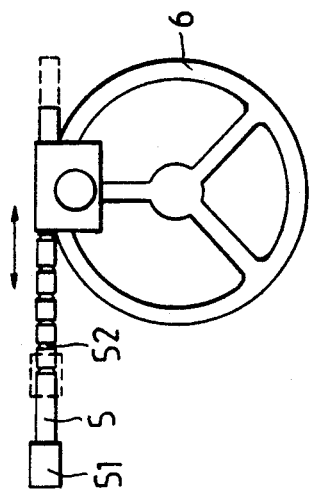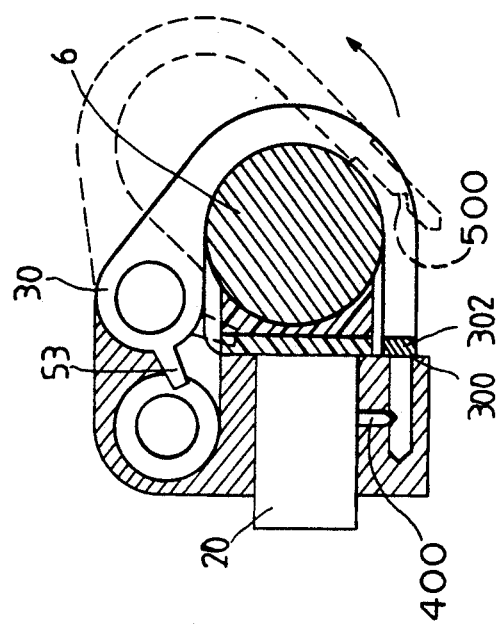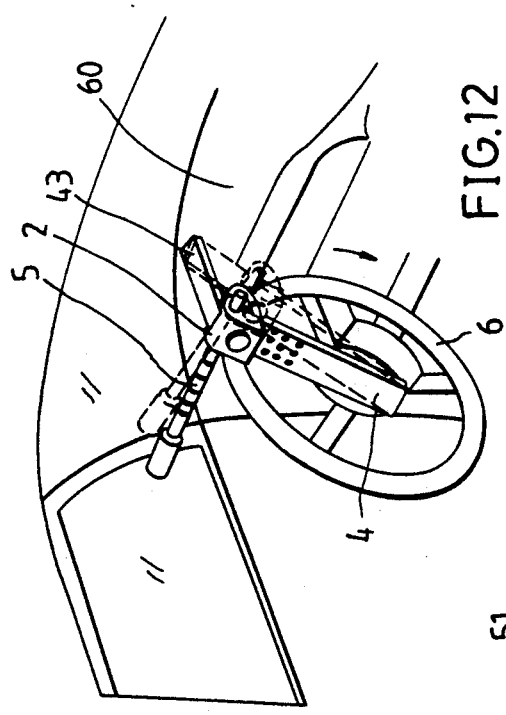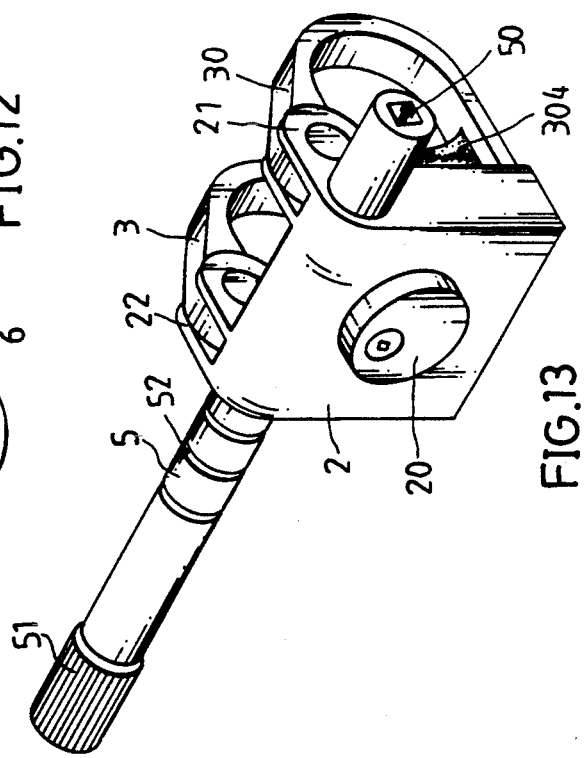

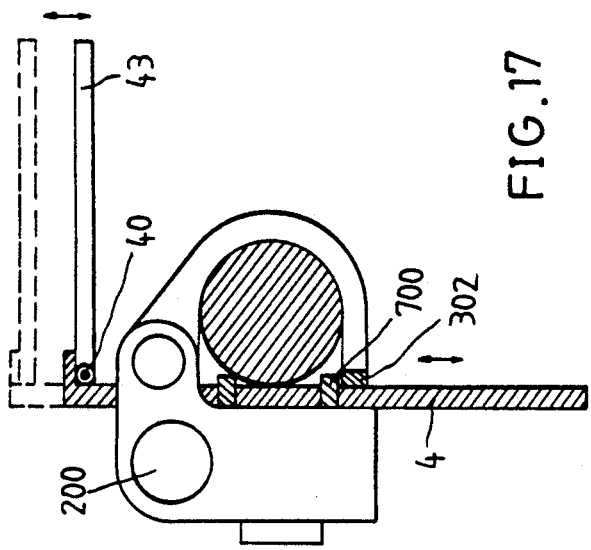
FIG. 17
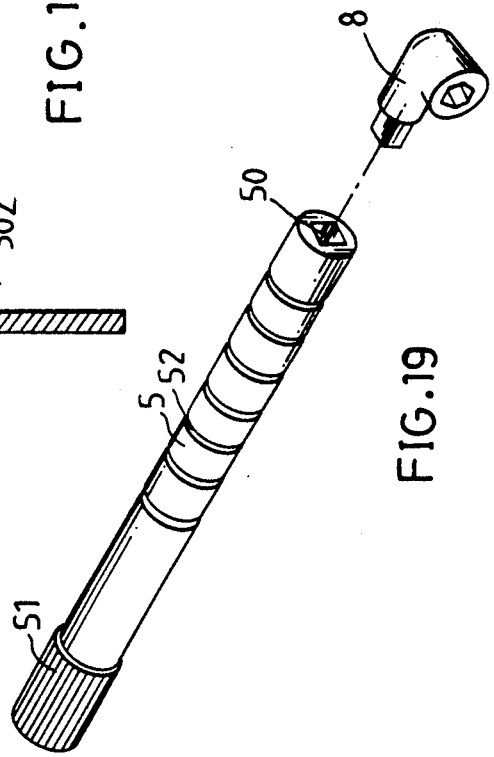
FIG. 19
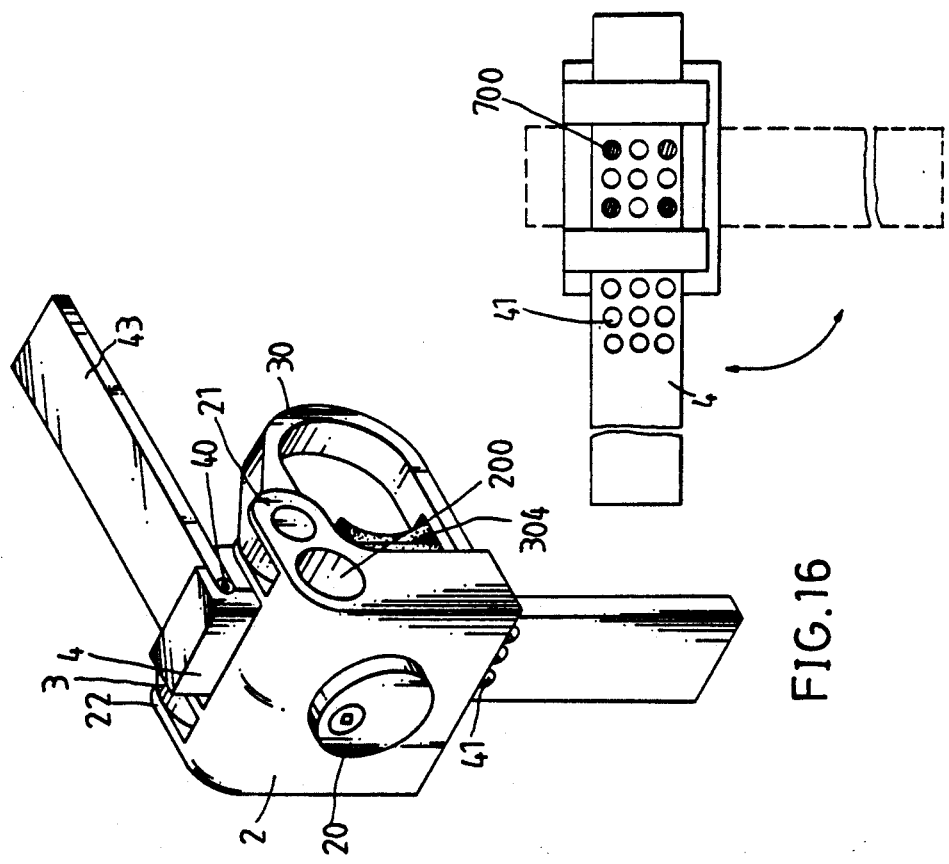
FIG. 18
FIG. 16

ADJUSTABLE STEERING LOCK

BACKGROUND OF THE INVENTION

The present invention relates to steering locks and relates more particularly to such a steering lock which has two spaced snap catches to fastened on a car steering wheel, a stop bar to stop against a car front door window and a stop plate to stop against a car instrument board.

Various types of steering locks have been disclosed for locking up a car steering wheel. FIG. 1 illustrates a steering lock according to the prior art, which is to lock up a car steering wheel by securing it to a brake pedal. Fastening a car steering wheel to a brake pedal by a steering lock may increase the stroke of a brake pedal easily. Extending the stroke of a brake pedal may cause spongy brake pedal problem. Further, this type of steering lock is complicated to install and requires much space to store. Once it is fastened in place to lock up a car steering wheel, it will binder a driver from moving in or out of a car.

FIGS. 3 and 4 illustrate another two different steering locks according to the prior art. These two different steering locks are similar in functional structure. They commonly have an extension bar secured to a car steering wheel by two hooks, which extension bar will be stopped against a certain part inside a car when the car steering wheel is rotated through a wide angle. Disadvantages of these steering locks are numerous. Because different cars have different inner spaces, the extension bar must be long enough to fit all cars. Extended size of extension bar requires much space to store when it is not in use. In order to reduce space occupation, the extension bar must be adjustable. However, this adjustable design makes the structure of a steering lock complicated and expensive to manufacture. Still another disadvantage of the abovementioned types of steering locks is that they are not suitable for locking the steering wheel of a sports car that does not have circumscribed circle around the horn button thereof. Installation of these types of steering locks on a car steering wheel is critical. Fastening a steering lock on a car steering wheel in an improper position may allow a car steering wheel to be rotated through a wide range of angle. Further, in either of the known structures of steering lock, there is no means to protect against insertion of a pry tool.

SUMMARY OF THE INVENTION

The present invention has been accomplished to eliminate the aforesaid problems. It is therefore an object of the present invention to provide a steering lock which locks up a steering wheel in three directions.

It is another object of the present invention to provide a steering lock which can be adjusted into different forms for locking up different steering wheels.

It is still another object of the present invention to provide a steering lock which is designed according to dynamics to firmly lock up a steering wheel in position.

It is still another object of the present invention to provide a steering lock which can be conveniently fastened on any type of steering wheel to lock it up in position.

It is still another object of the present invention to provide a steering lock which can be fastened in a motorcycle wheel to lock up a motorcycle in place.

It is still another object of the present invention to provide a steering lock which has rubber cushions on the lock case thereof to match with two snap catches for tightly fastening to a steering wheel.

It is still another object of the present invention to provide a steering lock which has a stop bar fastened in the lock case thereof for retaining the lock case on the steering wheel inside a car, which stop bar can be independently used as a tool handle.

It is still another object of the present invention to provide a steering lock which can be detached to reduce space occupation when it is not in use.

It is yet a further object of the present invention to provide a steering lock which has means to protect against insertion of a pry tool.

BRIEF DESCRIPTION OF THE DRAWINGS

FIG. 1 illustrates a structure of a steering lock according to the prior art;

FIG. 2 illustrates the operation of the steering lock of FIG. 1 in locking a steering wheel;

FIG. 3 illustrates another structure of a steering lock according to the prior art;

FIG. 4 illustrates still another structure of a steering lock according to the prior art;

FIG. 5 illustrates the operation of the steering lock of FIG. 4 in locking a steering wheel;

FIG. 6 is a dismantled perspective view of the preferred embodiment of the steering lock of the present invention;

FIG. 7 is a perspective assembly view of the preferred embodiment of the steering lock of the present invention;

FIG. 8 illustrates that the steering lock of the present invention is fastened inside a car to lock up the steering wheel therein;

FIGS. 9, 10, 11 and 12 illustrate the operation of the present invention in locking up a steering wheel inside a car;

FIG. 13 illustrates the stop bar being fastened in the lock case in position;

FIG. 14 illustrates the direction in adjusting the position of the stop bar in the lock case;

FIG. 15 illustrates the rotating direction of the snap catches in retaining or releasing the stop bar;

FIG. 16 illustrates that the L-shaped stop plate is fastened in the lock case in position;

FIG. 17 illustrates that the L—shaped stop plate is fastened in the lock case in a vertical position;

FIG. 18 illustrates that the L-shaped stop plate is adjusted from a vertical to a horizontal position relative to the lock case;

FIG. 19 illustrates that a stop bar is used as a handle for a tool.

DETAILED DESCRIPTION OF THE PREFERRED EMBODIMENT

Referring to FIGS. 6 and 7, a steering lock in accordance with the present invention is generally comprised of a lock case 2, two snap catches 3 and 30, an L-shaped stop plate 4 and a stop bar 5. The lock case 2 has a cylinder 20 provided with at least one control pin 400 at the front through which the steering lock can be locked or unlocked by a key, a hole 200 transversely disposed at an upper location for receiving and fastening the stop bar 5, two supports 21 and 22 at the back for holding the two snap catches 3 and 30, each having provided with a notch 500 and a plurality of raised portions 700 on the back side thereof arranged in rows and columns (see FIG. 18). Further, rubber cushions 304 may be fastened to the back side of the lock case 2 so that the steering lock can be tightly secured to a steering wheel while in a locked position. The two snap catches 3 and 30 each have one end pivotally secured to supports 22 and 21, respectively, and an opposite end connected to each other by a cross bar 302. Each snap catch 3 or 30 further comprises a flange 300 at a suitable location which seals the gap between the snap catch 3 or 30 and the lock case 2 once the snap catches 3 and 30 are locked in the lock case, as shown in FIG. 15, wherein at least one control pin 400 is engaged within a corresponding notch 500 of at least one snap catch 3, 30. The L-shaped stop plate 4 has a plurality of holes 41 arranged in rows and columns on the front face thereof for selectively receiving the raised portions 700. A back plate 43 is pivotably secured to the stop plate 4 by a hinge 40. Because of the effect of the hinge 40, the back plate 43 can be rotated to closely engage against the back side of the L-shaped plate 4 or to extend into a position perpendicular to the L-shaped plate 4 for mounting on the instrument board in a car. The stop bar 5 has a square hole 50 on one end, a protective cap 51 covered on an opposite end. After assembly, the steering lock can be fastened inside a car to lock up the steering wheel as shown in FIG. 8.

Referring to FIGS. 9, 10, 11 and 12, the snap catches 3 and 30 are fastened on the steering wheel 6 inside a car with the L-shaped stop plate 4 closely disposed above the horn button of the steering wheel 6 permitting the back plate 43 to be extended out to press on the instrument board 60. At the same time, the stop bar 5 which is fastened in the hole 200 on the lock case 2 and disposed as a tangent relative to the periphery of the steering wheel 6 is set in such a position with the protective cap 51 thereof stopped against the front door window of the car at the left side. Because the back plate 43 is stopped against the instrument board 60, rotation of the steering wheel 6 after locking will produce two counter forces A and B (on the back plate at two opposite side edges against the instrument board; see FIG. 9). When B (or A) is raised A (or B) is stopped. Therefore, the steering wheel 6 is prohibited from being rotated. If the back plate 43 is lifted from the instrument board 60, the L-shaped stop plate 4 will be forced to press on the horn button of the steering wheel 6, causing it to sound. Further, because the L-shaped stop plate 4 is stopped against the horn button of the steering wheel 6, the back plate 43 is prohibited from being lifted from the instrument board 60.

Referring to FIGS. 13, 14 and 15, the snap catches 3 and 30 each have a unitary projecting rod 53 extending from the end that is secured to the support 22 or 21, which projecting rod 53 is releasably engaged in a selected one of the annular grooves 52 that are made around the periphery of the stop bar 5. When the snap catches 3 and 30 are unlocked, the projecting rod 53 of each snap catch is released from the stop bar 5 permitting it to be removed from the hole 200 on the lock case 2. Once the snap catches 3 and 30 are locked, the projecting rod 53 of each snap catch is engaged in its corresponding annular groove 52 to firmly secure the stop bar 5 in the lock case 2. By selectively engaging the projecting rods 53 in any of annular grooves 52, the position of the stop bar 5 in the hole 200 on the lock case 2 can be conveniently adjusted.

Referring to FIGS. 16, 17 and 18, the number of holes 41 on the L-shaped stop plate 4 exceeds the number of raised portions 700 on the back side of the lock case 2. Therefore, by selectively engaging the raised portions 700 in the holes 41 on the L-shaped stop plate 4, the relative position of the L-shaped stop plate 4 in the lock case 2 is conveniently adjusted. As shown in FIG. 17, the L-shaped stop plate 4 can be secured to the lock case 2 at the back in a vertical position relative to the lock case 2. The L-shaped stop plate 4 can also be secured to the lock case 2 at the back in a horizontal position relative to the lock case 2 as shown in FIG. 18.

Referring to FIG. 19, a bit 8 or hand tool may be fastened in the square hole 50 on the stop bar 5 so that the stop bar 5 is used as a handle for a tool.

The present invention has been described in detail in connection with the preferred embodiment. It will be easily understood by those skilled in the art that various modifications and variations can be easily made without departing from the scope of this invention.

I claim:

1. A steering lock, the improvement comprising a lock case having a cylinder controlled by a key to lock two snap catches on a car steering wheel at two locations on the periphery of said car steering wheel defining therebetween a circumferential angle within 180°; a stop plate assembly comprising an L-shaped base plate including a back face secured to said lock case, and an extension plate vertically extending from said base plate at one end for engaging a car instrument board; and a stop bar having one end fastened in said lock case and an opposite end for engaging a car front door window.

2. The steering lock according to claim 1, wherein said extension plate includes one end pivotably secured to said L-shaped base plate at one end thereof for rotation through a 90° angle relative to said base plate.

3. The steering lock according to claim 1 wherein said base plate has a plurality of small holes arranged in rows and columns and said lock case has a plurality of raised portions arranged in rows and columns on the back side thereof at locations and in size corresponding to said small holes on said base plate for permitting said base plate to be alternatively fastened to said lock case in a vertical or horizontal position relative to said lock case.

4. The steering lock according to claim 1, wherein said stop bar has a plurality of equally spaced annular grooves around the periphery thereof said two snap catches each have a projecting rod at one end disposed in said lock case and rotatable to alternatively engage in or release from said annular grooves, thereby permitting said stop bar to be adjusted to a desired position relative to said lock case.

5. The steering lock according to claim 1, wherein said two snap catches are connected together by a cross bar which firmly secures said base plate to said lock case.

6. The steering lock according to claim 1, wherein said stop bar has a square hole on one end for fastening a tool.

* * * * *